United States Patent [19]
Davis

[11] 3,743,938
[45] July 3, 1973

[54] CLOSED DATA LOOP TEST APPARATUS FOR DATA TRANSMISSION MODEM

[75] Inventor: Steven Jay Davis, Ridgefield, Conn.

[73] Assignee: General Datacomm Industries, Norwalk, Conn.

[22] Filed: Aug. 10, 1971

[21] Appl. No.: 170,428

[52] U.S. Cl. ............. 325/67, 179/2 DP, 179/15 BF, 325/2, 325/3
[51] Int. Cl....... H04b 1/60, H04j 3/12, H04m 11/00
[58] Field of Search ..................... 325/2, 3, 67, 363; 179/2 DP, 15 BF

[56] References Cited

UNITED STATES PATENTS

| | | | |
|---|---|---|---|
| 2,840,797 | 6/1958 | Derr | 325/2 |
| 3,655,915 | 4/1972 | Liberman | 179/15 BF |
| 2,864,943 | 12/1958 | Schultz | 325/3 |

*Primary Examiner*—Howard W. Britton
*Attorney*—Dean S. Edmonds, Keith E. Mullenger et al.

[57] ABSTRACT

A method and apparatus are provided for operating a remotely located data transmission modem in a loop-back test on the digital or data output side of the modem in order to permit remote testing of the modem unit and interconnecting transmission system. Control apparatus is utilized in a local modem to send a center-frequency command signal that is sensed at the remote modem to automatically connect the respective input and output data leads. A second command signal transmitted from the local modem is sensed at the remote modem to restore that modem to normal operation.

9 Claims, 10 Drawing Figures

INVENTOR
Steven J. Davis
BY Pennie, Edmonds, Morton, Taylor & Adams
ATTORNEYS

PATENTED JUL 3 1973 3.743,938

SHEET 2 OF 3

INVENTOR
Steven J. Davis
BY Rennie, Edmonds, Morton, Taylor & Adams
ATTORNEYS

INVENTOR
Steven J. Davis
BY Pennie, Edmonds, Morton, Taylor & Adams
ATTORNEYS

CLOSED DATA LOOP TEST APPARATUS FOR DATA TRANSMISSION MODEM

BACKGROUND OF THE INVENTION

The present invention is related to data transmission systems and more specifically to duplex type modems which provide for simultaneous two-way transmission of data on a transmission circuit such as a two-wire telephone line. Such modems provide for modulation of a carrier by a stream of data bits received from a business or data-processing machine, transmission of the data modulated carrier over a conventional telephone circuit and recovery of the data bits at the receiving end by a carrier demodulator.

In the modern time-share computer systems, data is commonly transmitted many hundreds of miles through a variety of signal amplifying, switching and processing equipment. Because of system complexity and high operating costs, it has become increasingly important for an operator to be able to check the operating integrity of the data transmission system and in the event of failure to be able to identify the point of breakdown as rapidly and precisely as possible. Since the signal translating modem is so commonly used at the terminal ends of most data transmission systems, it would be desirable to have control means available for closed loop testing of a major system including the data set modem.

SUMMARY OF THE INVENTION

In accordance with the present invention, a method and means are provided for remotely testing an unattended data transmission modem on a channel basis by control circuits that operatively connect and disconnect the respective input and output data leads in response to test command signals generated by a local modem. In the preferred embodiment, the local modem is caused to generate a center-frequency command test signal for a predetermined period of time that is detected at the remote modem and utilized to control the connection of the data input and output terminals. Controlled dropout of the carrier generated by the local modem is used to terminate the closed data loop test.

The apparatus of the present invention may be advantageously used in combination with the time division multiplexer described in pending application Ser. No. 40,006 filed May 25, 1970 by Reymond et al. entitled "Programable Asynchronous Data Buffer Having Means To Transmit Error Protected Channel Control Signals". The error protected secondary control signals that can be transmitted in any selected channel may be utilized with the present invention to test an entire data transmission system including the digital interface at the remote end of the system.

DESCRIPTION OF THE DRAWINGS

In the drawings:

FIGS, 3A–D are timing and waveform diagrams of the test initiate signals generated at the local modem.

Referring to FIG. 1 there is shown a modem 20 having data input and output terminals 21 and 22 and modulated carrier input and output terminals 23 and 24 as shown. Means are provided for remotely testing the transmitter and receiver sections of modem 20 together with transmission lines 23 and 24 by circuits which operate to interconnect the transmitter and receiver terminals 21 and 22 as indicated by arrow 25.

Figures 1, 3A, 3B, 3C, 3D:
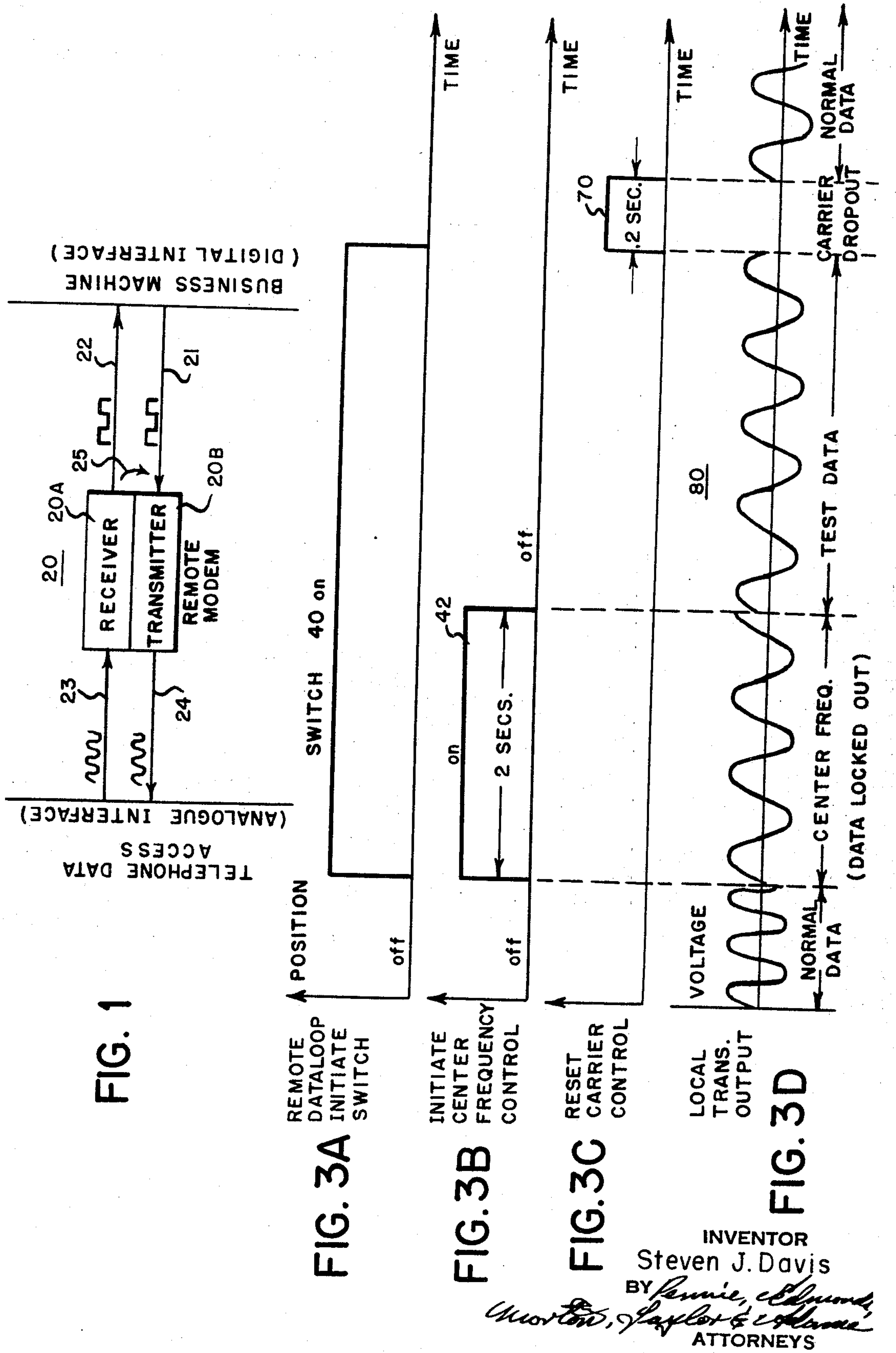
FIG. 1 is a simplified functional block diagram illustrating a typical data transmission system in which the data loopback test may be used.
Figure 2:
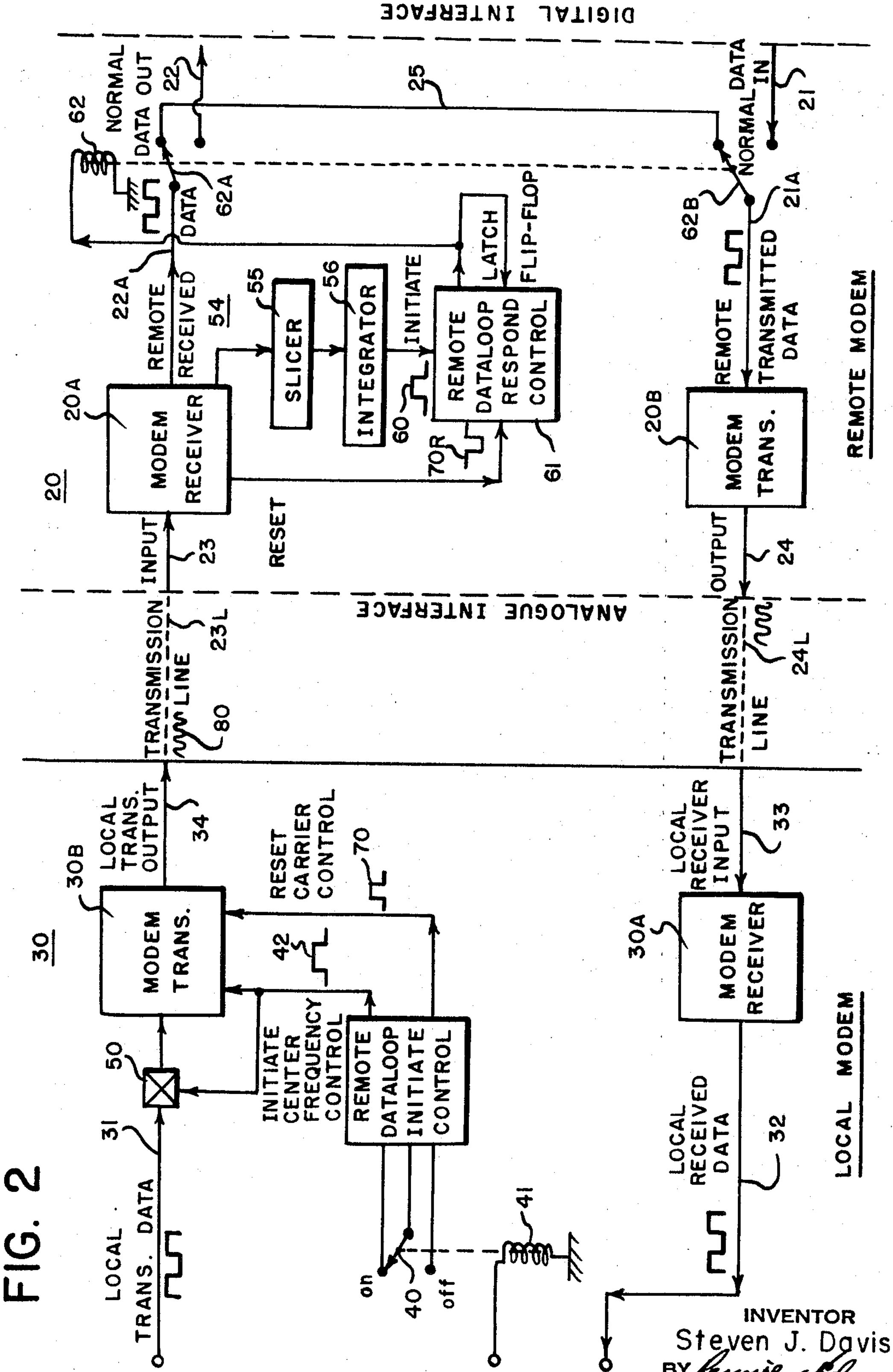
FIG. 2 is a simplified block diagram showing preferred means of the invention for providing data loopback test of a remote modem controlled by signals generated at a local modem.

The operation of a preferred embodiment of the invention will be described in conjunction with FIG. 2. The carrier modulated input and output terminals 23 and 24 of remote modem 20 are connected via transmission lines 23L and 24L to the corresponding output and input terminals 34 and 33, respectively of local modem 30. To facilitate the overall closed-loop testing of the data transmission channel from terminals 31, 32 to terminals 22, 21, each modem transmitter is provided with test initiate control apparatus that causes test response circuits in the cooperating remote modem receiver to interconnect the data input output terminals 21A, 22A by lead 25. it will of course be understood that in an operating system, either modem can be used to initiate the test control signal and can thus be considered as either a local or a remote modem as testing circumstances may require. It will be understood that the test initiate and reset signals may be produced apart from 30B by a separate test generator.

Figures 4A, 4B, 4C, 4D:
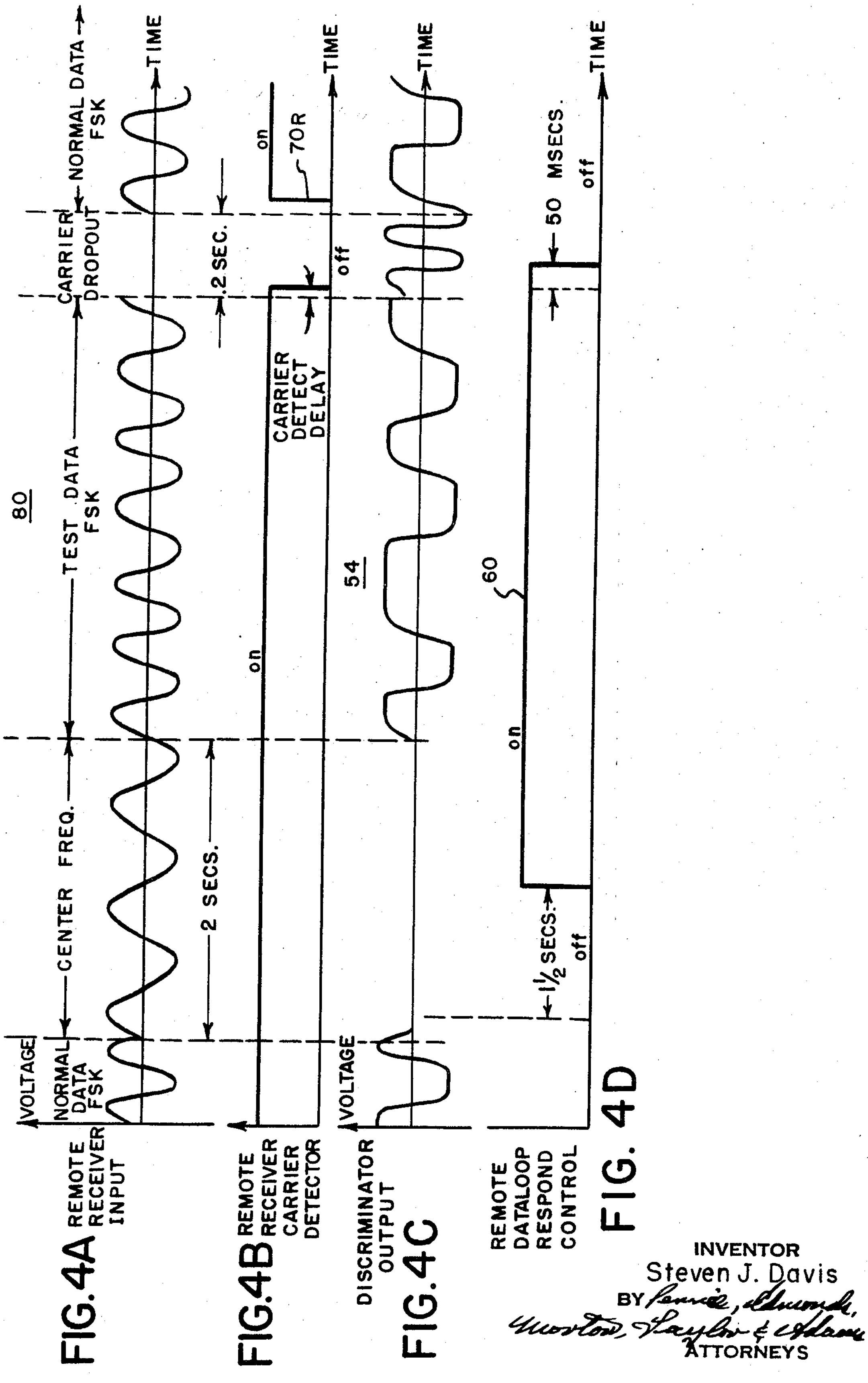
FIGS. 4A–D are timing and waveform control signals generated at the remote modem for control of the data loop-back test.

Loopback testing is initiated by actuation of switch 40 to its "on" position either by manual operation or by operation of solenoid 41 in response to a test control signal that may have been generated at another remote station and transmitted as a channel test signal in a cooperating time division multiplex system. Closure of switch 40 provides a timed D-C control signal that momentarily opens switch 50 to disconnect the digital input signals and at the same time key the FSK oscillator in transmitter 30B to its nominal center frequency for a period longer than the normal mark or space intervals, e.g. about 2 seconds. In remote receiver 20A, an output signal is taken from the receiver's FM detector, supplied to a double limiter or slicer 55 and in turn to integrator 56. The time constant of integrator 56 is selected so as to respond to the center-frequency discriminator output in about one and one-half seconds as shown in FIG. 4D and at the same time produce no output in response to the shorter duration mark and space data modulation. The transmission of a two second interval of center frequency by 30B is thus detected and shaped to produce a test initiate response pulse 60 that is utilized to actuate a control flip-flop 61 which energizes solenoid 62. As shown, the double-pole, double-throw switch contacts 62A, 62B are connected so as to close the data test loop via 25 and at the same time disconnect the respective output and input lines 22 and 21 from 22A and 21A.

After solenoid 62 has been actuated and switch 50 returned to its normally closed position, digital data signals may then be supplied to input terminal 31, transmitted to 20 via line 23L and returned to terminal 32 via 25, 20B, 24L and local receiver 30A. Thus the entire transmission system may be quickly and efficiently tested to the most remote unattended digital interface. When the test is completed, switch 40 is returned to its normally "off" position. In the latter event, a short duration reset carrier control pulse 70, generated by a conventional one-shot, is supplied to 30B and utilized to momentarily disable the carrier oscillator in 30B causing drop-out of carrier signal to the transmission system. At receiver 20A, a conventional carrier amplitude detector is provided to generate a reset pulse 70R in response to carrier dropout. Pulse 70R serves to reset flip-flop 61, de-energize solenoid 62 and thus return the system to its normal mode of operation.

FIGS. 3A–3D show, respectively, the timing and waveform diagrams for switch 40, test initiate pulse 42, test reset pulse 70 and carrier frequency output signal 80. Control pulses 42 and 70 may both be generated by conventional one-shot generators.

FIGS. 4A–4D are waveform and timing diagrams illustrating the response of the remote receiver control circuits to incoming signal 80 which produce control signals 70R and 60.

It will be apparent to those skilled in the art that various modifications may be made to the preferred embodiments described and illustrated herein without departing from the invention as defined in the claims.

I claim:

1. In a duplex data transmission modem having a receiver with an input terminal for receiving a frequency-shift data modulated carrier signal and an output terminal to which is supplied data signals demodulated from the input carrier signal; and a transmitter having an input terminal for receiving digital data signals and an output terminal to which is supplied a carrier signal frequency-shift modulated by the input digital data signals, means for closed loop testing the operation of said modem from the carrier signal side of said modem comprising:

a. first circuit means including an FM detector for sending a first signal supplied to the receiver input terminal and producing in response thereto a test initiate signal, said first signal having a frequency between those frequencies used for the transmission of data;

b. second circuit means for forming a reset signal; and c. switch means responsive to said test initiate signal for interconnecting the data output terminal of said receiver to the data input terminal of said transmitter, said switch means being further responsive to said reset signal to terminate the closed loop test by disconnecting the respective interconnected output and input data terminals.

2. Apparatus in accordance with claim 1 wherein the frequency of the first signal is substantially the center frequency.

3. Apparatus in accordance with claim 1 wherein the second circuit means includes a carrier amplitude detector for sensing interruption in the carrier signal supplied to said receiver input terminal and producing in response thereto a reset signal.

4. In a duplex data transmission modem having a receiver with an input terminal for receiving a frequency-shift data modulated carrier signal and an output terminal to which is supplied data signals demodulated from the input carrier signal; and a transmitter having an input terminal for receiving digital data signals and an output terminal to which is supplied a carrier signal frequency-shift modulated by the input digital data signals, means for closed loop testing the operation of said modem from the carrier signal side of said modem comprising:

a. oscillator means for generating and supplying to the input terminal of the receiver a carrier signal;

b. first switch means connected to said oscillator for shifting the operating frequency to a first frequency between those frequencies used for the transmission of data;

c. second switch means connected to said oscillator for momentarily disabling the oscillator;

d. first circuit means including an FM detector for sensing the first frequency signal supplied to the receiver input terminal and producing in response thereto a test initiate signal;

e. second circuit means for forming a reset signal; and f. switch means responsive to said test initiate signal for interconnecting the data output terminal of said receiver to the data input terminal of said transmitter, said switch means being further responsive to said reset signal to terminate the closed loop test by disconnecting the respective interconnected output and input data terminals.

5. Apparatus in accordance with claim 4 wherein the first switch means is operative to produce the first frequency signal for a time interval longer than either the mark or space intervals for data transmitted by said modem.

6. Apparatus in accordance with claim 4 wherein means are provided for remotely controlling said first and second switch means.

7. Apparatus in accordance with claim 4 wherein said oscillator is a frequency shift keyed oscillator in a local modem connected by a data transmission system to the modem that is closed loop tested.

8. Apparatus in accordance with claim 4 wherein said first frequency is at substantially the center of the mark-space frequency range of the receiver.

9. Apparatus in accordance with claim 4 wherein the second circuit means includes a carrier amplitude detector for sensing interruption in the carrier signal supplied to said receiver input terminal and producing in response thereto a reset signal.

* * * * *